US012812455B2

(12) United States Patent
Chao et al.

(10) Patent No.: US 12,812,455 B2
(45) Date of Patent: Nov. 24, 2026

(54) RATE CONTROL CONFIGURATION AND ADAPTATION

(71) Applicant: Nokia Technologies Oy, Espoo (FI)

(72) Inventors: Hua Chao, Shanghai (CN); Fernando Sanchez Moya, Wroclaw (PL); Devaki Chandramouli, Dallas, TX (US); Markus Sakari Isomäki, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/874,885

(22) PCT Filed: Jan. 7, 2023

(86) PCT No.: PCT/CN2023/071135

§ 371 (c)(1),
(2) Date: Dec. 13, 2024

(87) PCT Pub. No.: WO2024/145951

PCT Pub. Date: Jul. 11, 2024

(65) Prior Publication Data

US 2025/0374112 A1 Dec. 4, 2025

(51) Int. Cl.
*H04W 28/02* (2009.01)

(52) U.S. Cl.
CPC ................................ *H04W 28/0268* (2013.01)

(58) Field of Classification Search
CPC ................................................. H04W 28/0268
See application file for complete search history.

(56) References Cited

U.S. PATENT DOCUMENTS 12,108,277 B2 * 10/2024 Shariat .............. H04W 28/0268
2021/0136620 A1 * 5/2021 Laitila .................. H04W 28/06

(Continued)

FOREIGN PATENT DOCUMENTS

| | | | |
|---|---|---|---|
| CN | 109417534 | A | 3/2019 |
| CN | 114867030 | A | 8/2022 |
| WO | 2022/048744 | A1 | 3/2022 |

OTHER PUBLICATIONS

"3rd Generation Partnership Project; Technical Specification Group Services and System Aspects; Study on XR (Extended Reality) and media services (Release 18)", 3GPP TR 23.700-60, V1.2.0, Oct. 2022, pp. 1-266.

(Continued)

*Primary Examiner* — Hieu T Hoang
(74) *Attorney, Agent, or Firm* — ALSTON & BIRD LLP

(57) ABSTRACT

Example embodiments of the present disclosure relate to rate control configuration and adaptation. A first device transmits, to a second device, a service request comprising a group of requested service parameters and a plurality of alternative service requirements in a prioritized order, each alternative service requirement comprising at least one long time-scale rate control requirement and at least one short time-scale rate control requirement associated with a flow description; and receives, from the second device, a report of QoS notification by a fourth device based on a requested QoS profile and at least one alternative QoS profile corresponding to the group of the requested service parameters and the plurality of alternative service requirements. In this way, an aligned rate control configuration and adaptation can be achieved between applications and 5GS, which considers both long time-scale and short time-scale rate control requirements.

14 Claims, 8 Drawing Sheets

(56) References Cited

U.S. PATENT DOCUMENTS

| | | | | |
|---|---|---|---|---|
| 2022/0159504 | A1* | 5/2022 | Wei | H04W 28/0268 |
| 2022/0167217 | A1* | 5/2022 | Wei | H04W 36/0044 |
| 2022/0217574 | A1 | 7/2022 | Alieiev et al. | |
| 2022/0256393 | A1 | 8/2022 | Zhang et al. | |
| 2022/0295330 | A1 | 9/2022 | Ji et al. | |
| 2022/0312509 | A1* | 9/2022 | Kim | H04W 76/10 |
| 2023/0137509 | A1* | 5/2023 | Alonso | H04L 12/1407 455/406 |
| 2025/0193743 | A1* | 6/2025 | Li | H04W 4/24 |

OTHER PUBLICATIONS

"3rd Generation Partnership Project; Technical Specification Group Services and System Aspects; System architecture for the 5G System (5GS); Stage 2 (Release 17)", 3GPP TS 23.501, V17.6.0, Sep. 2022, pp. 1-571.

"3rd Generation Partnership Project; Technical Specification Group Services and System Aspects; Procedures for the 5G System (5GS); Stage 2 (Release 17)", 3GPP TS 23.502, V17.6.0, Sep. 2022, pp. 1-748.

"3rd Generation Partnership Project; Technical Specification Group Services and System Aspects; Policy and charging control framework for the 5G System (5GS); Stage 2 (Release 17)", 3GPP TS 23.503 V17.6.0, Sep. 2022, pp. 1-148.

"IEEE 802.1", Wikipedia, Retrieved on Nov. 8, 2024, Webpage available at : https://en.wikipedia.org/wiki/IEEE_802.1.

"New SID on Study on architecture enhancement for XR and media services", TSG SA Meeting #SP-94E, SP-211646, Agenda: 7.4, China Mobile, Dec. 14-20, 2021, 8 pages.

"IEEE 802.11", Wikipedia, Retrieved on Nov. 8, 2024, Webpage available at : https://en.wikipedia.org/wiki/IEEE_802.11.

International Search Report and Written Opinion received for corresponding Patent Cooperation Treaty Application No. PCT/CN2023/071135, dated Sep. 27, 2023, 8 pages.

* cited by examiner

RATE CONTROL CONFIGURATION AND ADAPTATION

RELATED APPLICATION

This application claims priority to PCT Patent Application No. PCT/CN2023/071135, filed 7 Jan. 2023, which is incorporated herein by reference in its entirety.

FIELD

Various example embodiments described herein generally relate to the field of telecommunication and in particular, to methods, devices, apparatus and computer readable storage medium for rate control configuration and adaptation.

BACKGROUND

Time Sensitive Communication (TSC) has been introduced as a part of Ultra Reliable and Low Latency Communication (URLLC) in 5G system (5GS). TSC was developed for supporting Time Sensitive Networking (TSN) features, for example, in fully centralized model. In 3GPP Rel-17, native TSC was introduced for allowing applications to request deterministic transmission capabilities via application programming interface (APIs) and without relying on TSN specific functions.

TSC Quality of Service (QoS) flows use a Delay-Critical Guaranteed Bitrate (DC-GBR) resource type. Every 5G QoS Identifier (5QI) standardized for the DC-GBR resource type is associated with a default value for Maximum Data Burst Volume (MDBV). DC-GBR is characterized by strict rate, latency and reliability guarantees. This is achieved via the definition of the MDBV and Guaranteed Flow Bit Rate (GFBR) for which Packet Delay Budget (PDB) and Packet Error Rate (PER) requirements shall be met.

SUMMARY

In general, example embodiments described herein provide a solution of rate control configuration and adaptation.

In a first example embodiment, there is provided a first device. The first device comprises at least one processor; and at least one memory storing instructions that, when executed by the at least one processor, cause the first device at least to: transmit, to a second device, a service request comprising a group of requested service parameters and a plurality of alternative service requirements prioritized in a prioritized order, the plurality of alternative service requirements comprising at least one long time-scale rate control requirement and at least one short time-scale rate control requirement associated with a flow description; and receive, from the second device, a report of QoS notification by a fourth device based on a requested QoS profile and at least one alternative QoS profile corresponding to the group of the requested service parameters and the plurality of alternative service requirements.

In a second example embodiment, there is provided a second device. The second device comprises at least one processor; and at least one memory storing instructions that, when executed by the at least one processor, cause the second device at least to: receive, from a first device, a service request comprising a group of requested service parameters and a plurality of alternative service requirements, the plurality of alternative service requirements in a prioritized order and comprising at least one long time-scale rate control requirement and at least one short time-scale rate control requirement associated with a flow description; at least one alternative QoS parameter set in the prioritized order and associated with a service data flow corresponding to the flow description, each alternative QoS parameter set comprising a first subset of long time-scale rate control parameters and a second subset of short time-scale rate control parameters; and transmit the at least one group of requested service parameters and the determined at least one alternative QoS parameter set to a third device for determining a requested QoS profile and at least one alternative QoS profile.

In a third example embodiment, there is provided a third device. The third device comprises at least one processor; and at least one memory storing instructions that, when executed by the at least one processor, cause the third device at least to: receive, from a second device, a group of requested service parameters and at least one alternative QoS parameter set in a prioritized order, each alternative QoS parameter set comprising a first subset of long time-scale rate control parameters and a second subset of short time-scale rate control parameters associated with a flow description corresponding to a service data flow; determine, based on the group of requested service parameters, a requested QoS profile associated to a QoS flow corresponding to the service data flow; determine, based on the at least one alternative QoS parameter set, at least one alternative QoS profile in the prioritized order, each alternative QoS profile comprising the first subset of long time-scale rate control parameters and the second subset of short time-scale rate control parameters; and transmit the requested QoS profile and the determined at least one alternative QoS profile to a fourth device for at least one of radio admission control and QoS fulfilment.

In a fourth example embodiment, there is provided a fourth device. The fourth device comprises at least one processor; and at least one memory storing instructions that, when executed by the at least one processor, cause the fourth device at least to: receive, from a third device, a requested QoS profile and at least one alternative QoS profile in a prioritized order, each alternative QoS profile comprising a first subset of long time-scale rate control parameters and a second subset of short time-scale rate control parameters associated with a QoS flow; and perform at least one of radio admission control and QoS fulfilment on the QoS flow based on a network condition, the requested QoS profile and the at least one alternative QoS profile.

In a fifth example embodiment, there is provided a method. The method comprises: transmitting, at a first device and to a second device, a service request comprising a group of requested service parameters and a plurality of alternative service requirements in a prioritized order, the plurality of alternative service requirements comprising at least one long time-scale rate control requirement and at least one short time-scale rate control requirement associated with a flow description; and receiving, from the second device, a report of QoS notification by a fourth device based on a requested QoS profile and at least one alternative QoS profile corresponding to the group of the requested service parameters and the plurality of alternative service requirements.

In a sixth example embodiment, there is provided a method. The method comprises: receiving, at a second device and from a first device, a service request comprising a group of requested service parameters and a plurality of alternative service requirements, the plurality of alternative service requirements in a prioritized order and comprising at least one long time-scale rate control requirement and at least one short time-scale rate control requirement associated with a flow description; and determining, based on the group of service parameters and the plurality of alternative service requirements, at least one group of service parameters and at least one alternative QoS parameter set in the prioritized order and associated with a service data flow corresponding to the flow description, each alternative QoS parameter set comprising a first subset of long time-scale rate control parameters and a second subset of short time-scale rate control parameters; and transmitting the determined at least one group of requested service parameters and the determined at least one alternative QoS parameter set to a third device for determining a requested QoS profile and at least one alternative QoS profile.

In a seventh example embodiment, there is provided a method. The method comprises: receiving, at a third device and from a second device, a group of requested service parameters and at least one alternative QoS parameter set in a prioritized order, each alternative QoS parameter set comprising a first subset of long time-scale rate control parameters and a second subset of short time-scale rate control parameters associated with a flow description corresponding to a service data flow; determining, based on the group of requested service parameters, a requested QoS profile associated to a QoS flow corresponding to the service data flow; determining, based on the at least one alternative QoS parameter set, at least one alternative QoS profile in the prioritized order, each alternative QoS profile comprising the first subset of long time-scale rate control parameters and the second subset of short time-scale rate control parameters; and transmitting the requested QoS profile and the at least one alternative QoS profile to a fourth device for at least one of radio admission control and QoS fulfilment.

In an eighth example embodiment, there is provided a method. The method comprises: receiving, at a fourth device and from a third device, a requested QoS profile and at least one alternative QoS profile in a prioritized order, each alternative QoS profile comprising a first subset of long time-scale rate control parameters and a second subset of short time-scale rate control parameters associated with a QoS flow; and performing at least one of radio admission control and QoS fulfilment on the QoS flow based on a network condition, the requested QoS profile and the at least one alternative QoS profile.

In a nineth example embodiment, there is provided a first apparatus. The first apparatus comprises: means for transmitting, to a second apparatus, a service request comprising a group of requested service parameters and a plurality of alternative service requirements in a prioritized order, the plurality of alternative service requirements comprising at least one long time-scale rate control requirement and at least one short time-scale rate control requirement associated with a flow description; and means for receiving, from the second apparatus, a report of QoS notification by a fourth apparatus based on a requested QoS profile and at least one alternative QoS profile corresponding to the group of the requested service parameters and the plurality of alternative service requirements.

In a tenth example embodiment, there is provided a second apparatus. The second apparatus comprises: means for receiving, from a first apparatus, a service request comprising a group of requested service parameters and a plurality of alternative service requirements, the plurality of alternative service requirements in a prioritized order and comprising at least one long time-scale rate control requirement and at least one short time-scale rate control requirement associated with a flow description; means for determining, based on the group of service parameters and the plurality of alternative service requirements, at least one group of service parameters and at least one alternative QoS parameter set in the prioritized order and associated with a service data flow corresponding to the flow description, each alternative QoS parameter set comprising a first subset of long time-scale rate control parameters and a second subset of short time-scale rate control parameters; and means for transmitting the at least one group of requested service parameters and the determined at least one alternative QoS parameter set to a third apparatus for determining a requested QoS profile and at least one alternative QoS profile.

In an eleventh example embodiment, there is provided a third apparatus. The third apparatus comprises: means for receiving, from a second apparatus, a group of requested service parameters and at least one alternative QoS parameter set in a prioritized order, each alternative QoS parameter set comprising a first subset of long time-scale rate control parameters and a second subset of short time-scale rate control parameters associated with a flow description corresponding to a service data flow; means for determining, based on the group of requested service parameters, a requested QoS profile associated to a QoS flow corresponding to the service data flow; means for determining, based on the at least one alternative QoS parameter set, at least one alternative QoS profile in the prioritized order, each alternative QoS profile comprising the first subset of long time-scale rate control parameters and the second subset of short time-scale rate control parameters; and means for transmitting the requested QoS profile and the at least one alternative QoS profile to a fourth apparatus for at least one of radio admission control and QoS fulfilment.

In a twelfth example embodiment, there is provided a fourth apparatus. The fourth apparatus comprises: means for receiving, from a third apparatus, a requested QoS profile and at least one alternative QoS profile in a prioritized order, each alternative QoS profile comprising a first subset of long time-scale rate control parameters and a second subset of short time-scale rate control parameters associated with a QoS flow; and means for performing at least one of radio admission control and QoS fulfilment on the QoS flow based on a network condition, the requested QoS profile and the at least one alternative QoS profile.

In a thirteenth example embodiment, there is provided a computer readable medium. The computer readable medium comprises instructions stored thereon for causing an apparatus to perform at least the method according to any of the fifth aspect, the sixth aspect, the seventh aspect or the eighth aspect.

It is to be understood that the Summary section is not intended to identify key or essential features of embodiments described herein, nor is it intended to be used to limit the scope of the disclosure. Other features of the disclosure will become comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
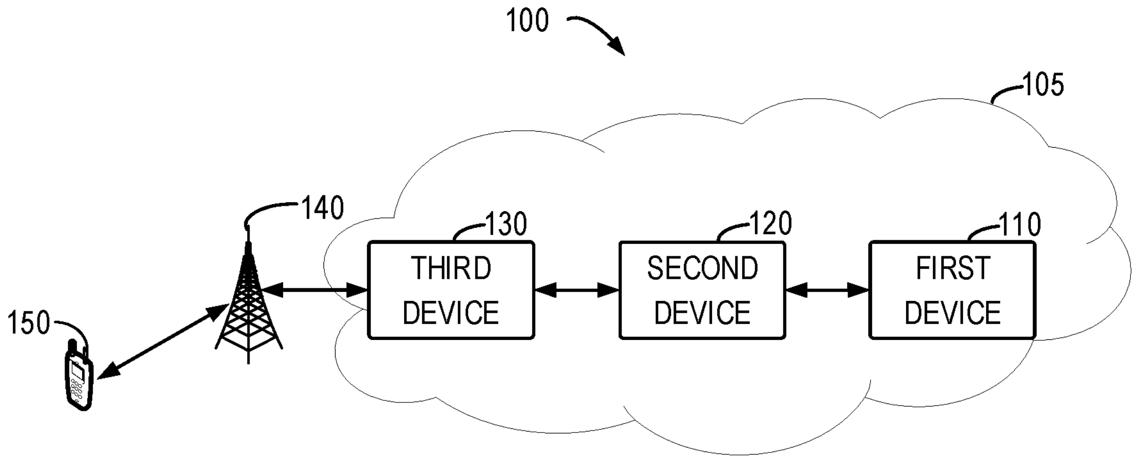
FIG. 1 illustrates an example communication environment in which example embodiments of the disclosure can be implemented.

The disclosure will now be described with reference to some example embodiments. It is to be understood that these embodiments are described only for the purpose of illustration and help those skilled in the art to understand and implement the disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skill in the art to which this disclosure belongs.

References in the disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, "at least one of the following: <a list of two or more elements> and "at least one of <a list of two or more elements> and similar wording, where the list of two or more elements are joined by "and" or "or", means at least any one of the elements, or at least any two or more of the elements, or at least all the elements. In addition, the term "and/or" includes any and all combinations of one or more of the listed terms.

As used herein, the term "circuitry" may refer to one or more or all of the following:

(a) hardware-only circuit implementations (such as, implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term herein, including in any claims. As a further example, as used herein, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so forth. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the disclosure may be applied in various communication systems. Given the rapid development in communications, there will of course also be future type communication technologies and systems with which the disclosure may be embodied. It should not be seen as limiting the scope of the disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a Next Generation NodeB (NR NB), a Remote Radio Unit (RRU), a radio header (RH), a remote radio head (RRH), Integrated Access and Backhaul (IAB) node, a relay, a low power node, such as a femto, a pico, and so forth, depending on the applied terminology and technology. The network device is allowed to be defined as part of a gNB, such as, for example in CU/DU split in which case the network device is defined to be either a gNB-CU or a gNB-DU.

The term “terminal device” refers to any device (e.g., end device) that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may, for example, be implemented as or include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices, such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and so forth. The terminal device may also correspond to Mobile Termination (MT) part of the integrated access and backhaul (IAB) node (a.k.a. a relay node). As used herein, the terms “terminal device”, “communication device”, “terminal”, “user equipment” and “UE” may be used interchangeably.

As used herein, alternative QoS profile and alternative QoS parameter set may be used interchangeably. The term “alternative QoS profile” may indicate the concept while the term “alternative QoS parameter set” may indicate the IE conveyed in the NG-AP protocol between RAN and 5GC.

Although functionalities described herein can be performed, in various example embodiments, in a fixed and/or a wireless network node, in other example embodiments, functionalities may be implemented in a user equipment apparatus (such as, a cell phone or tablet computer or laptop computer or desktop computer or mobile IoT device or fixed IoT device). This user equipment apparatus can, for example, be configured with corresponding capabilities as described in connection with the fixed and/or the wireless network node(s), as appropriate. The user equipment apparatus may be implemented as or included in the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

With the development of computer technology and communication technology, mobile media services, e.g., cloud-based Augmented Reality (AR), Virtual Reality (VR), cloud gaming, video-based tele-control for machines or drones, are expected to increase their contribution to the traffic of 5G networks in the coming years. Interactive media traffic, independently from the codec used, tends to share some common characteristics, e.g., high throughput, low latency, and high reliability requirement. To support these common characteristics, Extended Reality (XR) services, which include AR, VR, MR and so forth, can benefit from reusing the current 5GS generic TSC and exposure framework.

The mobile media services consist of video streams primarily from the traffic volume perspective. In principle, video traffic is highly adaptive with respect to the available bitrate. Adaptation may be implemented by reducing at least one of the frame rate, quality, resolution of the video stream, etc. Which methods are best from the quality of experience (QoE) perspective may vary and depend on a specific application.

In view of the above, TSC QoS flows and DC-GBR 5QIs may be configured for advanced media services, e.g., High Data Rate Low Latency (HDRLL) services, AR/VR/XR services, and tactile or multi-modality communication services. However, the performance guaranteed by DC-GBR comes at a radio resource reservation cost. This resource reservation may be significant for XR services with high data rate and low latency requirements. In order to maintain fairness towards other users or services and efficiently utilize the cell capacity, it is beneficial to know the application traffic characteristics and requirements. This enables good alignment with the corresponding QoS flow or data radio bearer (DRB) configurations (e.g., MDBV, GFBR, PDB, etc.), so that the 5GS can provide the desired QoS while minimizing the need to over-provision for guarantees with uncertain traffic.

The challenge with interactive and rate-adaptive services, such as XR, cloud-gaming video is how to come up with proper rate control configuration, considering their variable traffic properties, e.g., video frames, burst sizes, inter-arrival times including potential jitter, etc. The rate adaptation typically is performed by the source codec, e.g., changes in video frame rate, periodicity, frame size, etc. depending on radio conditions and application-level measurements of the experienced quality. This is in contrast with the typical traffic patterns that is involved in TSC/IIoT scenarios, which tend to be much more deterministic and non-adaptive and thus easier to match via DC-GBR configuration.

In particular, it has been observed that an average rate requirement alone is not enough for DC-GBR. The GFBR alone is ambiguous for rate control in the RAN. Assuming a video stream traffic pattern with a certain frame rate or periodicity and frame size, which results in a specific GFBR, when the reference GFBR is halved due to adapting to halved throughput, a new requirement of 0.5*GFBR can be associated with different possible MDBVs and corresponding peak-to-average throughput (TP) ratios, for example, MDVB with TP=2×, 0.5*MDVB with TP=×, 2*MDVB with TP=4×, and so forth. This may depend on the codec implementation and rate adaptation algorithm, e.g., the chosen tradeoff between frame rate and frame resolution/quality), which determine different RAC and scheduler demands. For instance, higher peak-to-average TP ratios or burst peak rate requirements tend to be more challenging to fulfill over radio with guarantees.

Therefore, it is expected that QoS mechanisms can be enhanced for aligning the application traffic characteristics and requirements to the QoS configuration and treatment provided by the 5GS.

According to some example embodiments of the disclosure, there is provided a solution of rate control configuration and adaptation. As provided herein, aligned rate control configuration and adaptation between applications and 5GS for service data flow can be achieved. This may, for example, be achieved by providing both long time-scale and short time-scale rate control requirements of service data flow by the application function (AF) to the 5G core network (5GC). The short time-scale rate control requirements correspond to the requested rate control points. Accordingly, the 5GC is able to derive rate control requirements including long time-scale and short time-scale rate control parameters, and convey such information to 5G-AN for rate control configuration and adaptation.

Example Environment

FIG. 1 illustrates an example communication environment 100 in which example embodiments of the disclosure can be implemented. The communication environment 100 may be a communication system supporting rate control configuration and adaptation. As shown in FIG. 1, the communication environment 100 includes a first device 110, a second device 120, a third device 130, a fourth device 140, and at least one terminal device 150.

The first device 110, the second device 120, the third device 130 and the fourth device 140 may communicate with each other in the 5GS, where first device 110, the second device 120, the third device 130 are network devices in the 5GC 105, whereas the fourth device 140 is included in the 5G-Access Network (AN). The first device 110 may be an AF, which is referred to as AF 110 hereinafter. The AF may support a TSC feature that transmits a service request for specific traffic (e.g., a QoS request of AF session) to the 5GS, for example, the policy control function (PCF) or network exposure function (NEF). In particular, the AF may communicate with PCF via a Npcf service, while with NEF via a Nnef service.

The QoS request may include a group of requested service parameters comprising at least one of the following individual QoS parameters, e.g., a requested priority, the maximum burst size, a requested 5GS delay, the requested maximum bitrate, the requested guaranteed bitrate (e.g., GFBR), periodicity, and so forth.

Additionally, in some example embodiments, the first device 110 may transmit alternative service requirements via the service request. The alternative service requirements may include one or more requested alternative QoS parameter sets in a prioritized order. Specifically, each alternative service requirement may include, but not limited to, requested GFBR, requested 5GS delay, and PER. The alternative service requirements may be in a prioritized order, for example, based on the priority and so forth.

In some example embodiments, the first device 110 may also provide discrete rate control points to the NEF, or directly to the second device 120 with flow descriptions corresponding to service data flows using DC-GBR resource type. The discrete rate control points may be indicated by one or more long time-scale rate control requirements and short time-scale rate control requirements associated with a flow description. In particular, such discrete rate control points may be indicated by parameters of {maximum burst Size, transmit interval} or {maximum burst size, periodicity}. In these embodiments, the transmit interval may be set as frames per second (e.g., fps) for a video service. The first device 110 may also subscribe event notification about QoS Notification Control (QNC) report from 5GS.

In some example embodiments, the first device 110 may receive a report from the second device 120. The report may comprise a QoS notification associated with a QoS flow by the fourth device 140 based on a request QoS profile corresponding to the requested individual QoS parameters and at least one alternative QoS profile corresponding to one or more alternative service requirements.

The second device 120 may be the PCF, which is referred to as PCF 120 hereinafter. In some example embodiments, the first device 110 may directly communicate with the second device 120. Alternatively, in some example embodiments, the first device 110 may communicate with the second device 120 via the NEF of the 5GS. In this case, the NEF may receive the request of AF session with QoS parameters via, for example, Nnef_AFSessionWithQoS_Creat Request service, and then forward the received QoS parameters of the AF session to the PCF via the Npcf service, for example, Npcf_PolicyAuthorization_Update service.

The second device 120 may perform 5QI mapping and derive the PDB and an averaging window (AW) for requested service data flow (e.g., DC-GBR service flows). Additionally, in some example embodiments, the second device 120 may derive long time-scale and the short time-scale rate control parameters associated with a flow description. By ways of example, the long time-scale rate control parameters may be indicated by a pair of parameters {GFBR, AW}. The short time-scale rate control parameters may be indicated by a pair of {MDBV, periodicity}, or {MDBV, frame per second}.

MDBV and GFBR may be considered as parameters for DC-GBR resource type. In particular, MDBV denotes the largest amount of data that the 5G access network (5G-AN) is required to serve within a period of 5G-AN PDB. It determines a burst peak rate requirement (equal to MDBV divided by 5G-AN PDB) that shall be guaranteed via the scheduler and RAC. Hence, MDBV can be considered as a short time-scale rate control parameter. GFBR defines a guaranteed average bit rate which is measured over an AW. The default AW may be, for example, 2 seconds, thus GFBR can be considered as a longer time-scale rate control parameter. GFBR also needs to be guaranteed via the scheduler and RAC.

The periodicity may be derived by the received frame per second. With the PDB and the CN PDB which may be obtained from SMF during a PDU session establishment procedure, the second device 120 may determine the 5G-AN PDB associated with a PDU session. Moreover, the second device 120 may derive MDBV based on the Maximum Burst Size, PDB and periodicity, which will be discussed in detail later.

In some example embodiments, the second device 120 may determine one or more alternative QoS parameter sets in the same prioritized order as indicated by the first device 110 based on the individual QoS parameters and the one or more requested alternative QoS parameter sets associated with a service data flow corresponding to the flow description. Each alternative QoS parameter set may include a first subset of long time-scale rate control requirements, and a second subset of short time-scale rate control requirements. The second device 120 may then transmit the individual QoS parameters and the determined one or more alternative QoS parameter sets to the third device 130. For example, the list of alternative QoS parameter sets may be transmitted within policy and charging control (PCC) rule. In addition, based on receiving the event notification subscription about QNC, the second device 120 may also enable QNC and include an indicator in the PCC rule.

The third device 130 may be the session management function (SMF), which is also referred to as SMF 130 hereinafter. Based on received individual QoS parameters and the one or more alternative QoS parameter sets associated to a service data flow, the third device 130 may determine one requested QoS profile and one or more alternative QoS profiles associated to a QoS flow in the same prioritized order as indicated by the second device 120. In addition, the third device 130 may add the second subset of short time-scale rate control parameters to the alternative QoS profile. The third device 130 may then transmit them together with the received QNC indicator to the fourth device 140 via SM NAS signaling, for example, PDU Session Resource Modify Request.

The fourth device 140 may be a network device at radio access network (RAN), such as, gNB. Based on receiving the requested QoS profile and at least one alternative QoS profile, the fourth device 140 may attempt to fulfil the QoS profile. If the requested QoS profile cannot be fulfilled, the fourth device 140 may send a notification to the third device 130 that the QoS profile is not fulfilled. The fourth device 140 may check whether any of the at least one alternative QoS profile in the indicated prioritized order can be fulfilled.

Figure 2:
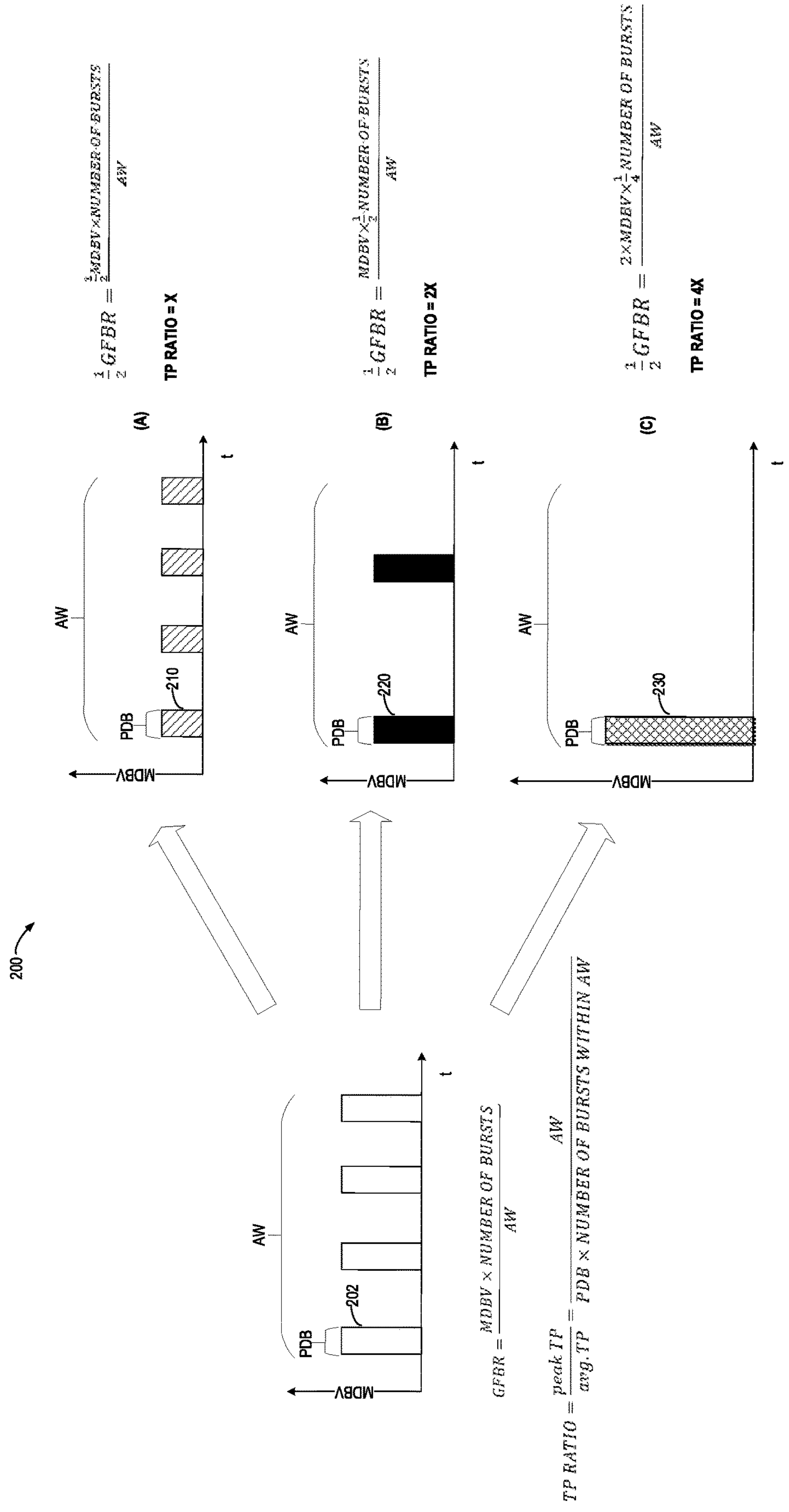
FIG. 2 illustrates a schematic diagram of examples of rate control configuration of DC-GBR according to some example embodiments of the disclosure.

FIG. 2 illustrates a schematic diagram of examples of rate control configuration of DC-GBR according to some example embodiments of the disclosure. The left-hand side of FIG. 2 shows a video stream traffic pattern with a certain frame rate (or periodicity) and frame size resulting in a specific GFBR. The right-hand side of FIG. 2 shows various rate control configurations (a) to (c) corresponding to different alternative QoS profiles, where the reference GFBR is halved (i.e., 0.5*GFBR) due to adapting to halved throughput.

In particular, according to rate control configuration (a), the MDBV is reduced to ½MDBV, while the TP ratio and the number of bursts keep unchanged, which can be determined as follows:

$$\frac{1}{2}GFBR = \frac{\frac{1}{2}MDBV \times \text{NUMBER OF BURSTS}}{AW} \tag{1}$$

$$TP\text{ ratio} = X \tag{2}$$

According to rate control configuration (b), the MDBV keeps unchanged, while the TP ratio increases to twice the TP in the current video stream traffic pattern, i.e., 2×, and the number of bursts is halved, which can be determined as follows:

$$\frac{1}{2}GFBR = \frac{MDBV \times \frac{1}{2}\text{NUMBER OF BURSTS}}{AW} \tag{3}$$

$$TP\text{ ratio} = 2X \tag{4}$$

According to rate control configuration (c), the MDBV increases to 2×MDBV, the TP ratio increases to 4×, and the number of bursts is reduced to a quarter of that in the current video stream traffic pattern, which can be determined as follows:

$$\frac{1}{2}GFBR = \frac{2 \times MDBV \times \frac{1}{4}\text{NUMBER OF BURSTS}}{AW} \tag{5}$$

$$TP\text{ ratio} = 4X \tag{6}$$

It can be seen on the right that the new 0.5*GFBR requirement can be associated with different possible MDBVs and TP ratios, which depends on the codec implementation and rate adaptation algorithm, e.g., the chosen tradeoff between frame rate and frame resolution/quality. For instance, based on the short-term to long-term rate ratio (peak-to-average throughput ratio in FIG. 2, derived from MDBV, PDB and GFBR), the RAC function in RAN may estimate that fulfilling the demands of a certain QoS profile requires an excessive or not feasible reservation of resources, whereas the resource requirement for an alternative QoS profile (e.g., with lower peak-to-average throughput ratio) might be acceptable.

If there is a match, the fourth device 140 may indicate a reference of the matched alternative QoS profile with the highest priority together with the notification that the requested QoS profile is not fulfilled. In some example embodiments, the fourth device 140 may perform more accurate RAC decisions and estimation of feasible alternative QoS to be fulfilled (e.g., upgrade QoS profile, downgrade QoS profile, etc.), based on the requested or alternative long time-scale rate or short time-scale control requirements provided by the 5GC.

During a lifetime of the QoS flow, the fourth device 140 may perform QoS fulfilment for example, an accurate estimation of feasible QoS to fulfil based on received rate control points (i.e., the long and short time-scale rate control parameters). The fourth device 140 may always try to fulfil the QoS profile and, if this is not possible, any alternative QoS profile that has higher priority. It shall be noted that it could also be possible to make up-grade or down-grade to another or a previous QoS profile after a while.

Referring back to FIG. 1, the fourth device 140 may serve at least one terminal device 150 (e.g., UE). A link from the fourth device 140 to the terminal device 150 is referred to as a downlink (DL). Additionally, a link from the terminal device 150 to the fourth device 140 is referred to as an uplink (UL). It should be understood that the service data flow may be either UL traffic or DL traffic. For DL traffic, the first device 110 may further inform an application server (AS) to trigger adaptation of DL traffic. For UL traffic, the first device 110 may notify the application layer client in the terminal device 150 using application layer protocol, which triggers adaptation of UL traffic.

It is to be understood that the number of devices and their connections shown in FIG. 1 are only for the purpose of illustration without suggesting any limitation. The communication network 100 may include any number of devices configured to implementing example embodiments of the disclosure. Although not shown, it would be appreciated that one or more additional devices and connections may be deployed in the communication network 100.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Work Principle and Example Signaling for Communication

According to some example embodiments of the disclosure, there is provided a solution of rate control configuration and adaptation. As provided herein, the AF is allowed to provide discrete rate control points to RAN via 5GC for service data flows. The rate control points are indicated by both long time-scale rate control requirements and short time-scale rate control requirements. The 5GC then derives the long time-scale and the short time-scale rate control parameters for the QoS flows corresponding on service data flows based on the discrete rate control points, and provides such information to the RAN. As a result, the RAN can perform more accurate RAC decisions and estimation of feasible alternative QoS to be fulfilled based on the requested and alternative long/short time-scale rate control parameters provided by the 5GC. In this manner, rate control configuration and adaptation can be aligned between applications and 5GS for specific traffic.

Figure 3:
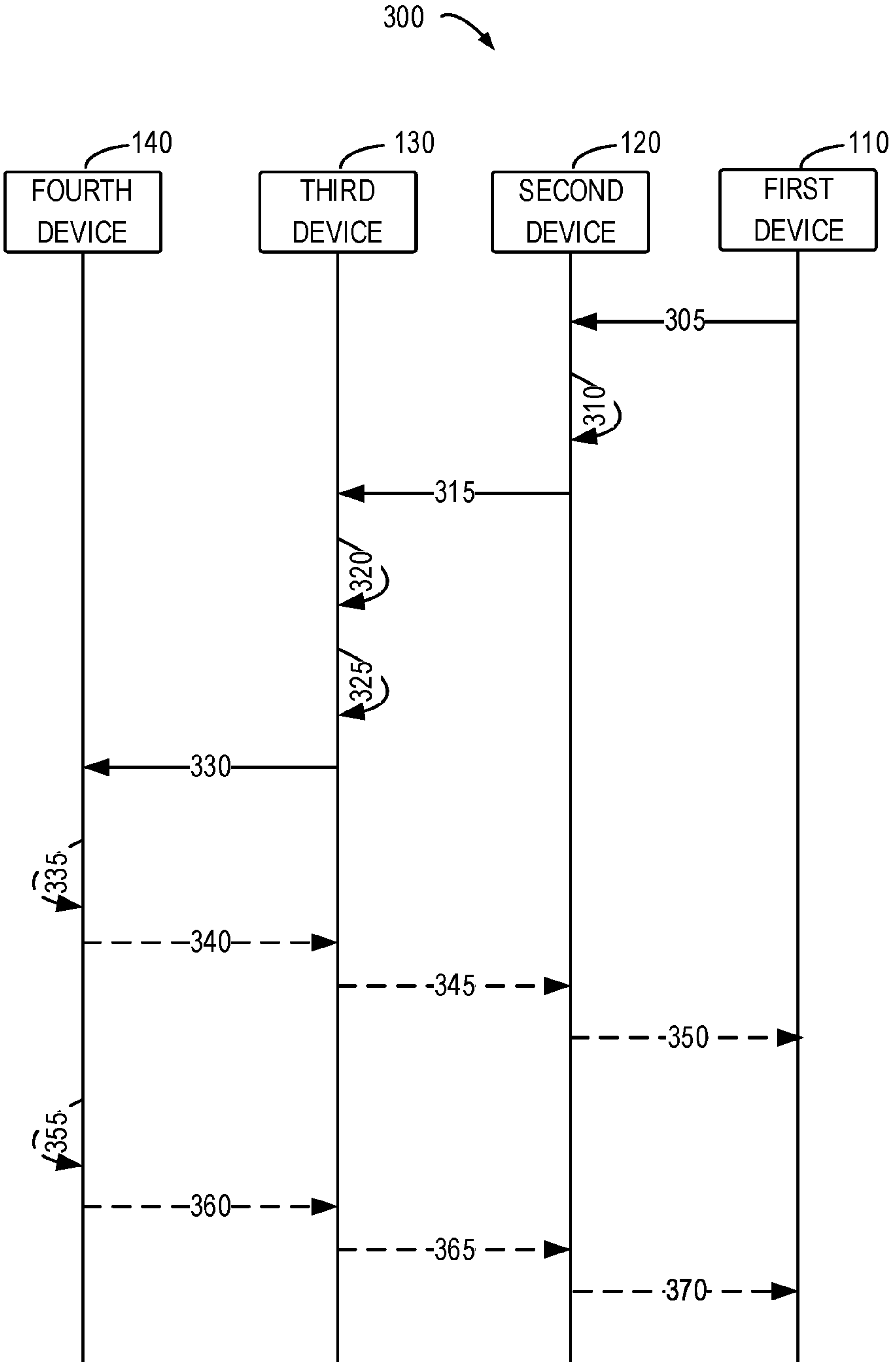
FIG. 3 illustrates a signaling chart for rate control configuration and adaptation according to some example embodiments of the disclosure.

Reference is now made to FIG. 3, which illustrates a signaling chart for rate control configuration and adaptation according to some example embodiments of the disclosure. As shown in FIG. 3, the process 300 involves the first device 110, the second device 120, the third device 130 and the fourth device 140. For the purpose of discussion, reference is made to FIG. 1 to describe the signaling flow 300.

During a PDU session establishment procedure, the third device 130 may provide the CN PDB to the second device 120 that is associated with the PDU session. The CN PDB may be used for deriving the 5G-AN PDB associated with the PDU session.

In process 300, the first device 110 transmits 305 a service request comprising a group of requested service parameters and a plurality of alternative service requirements to the second device 120.

The service request may, for example, be a request for AF sessions with requested QoS parameters including but not limited to can include at least one of a first requested GFBR, a first request 5GS delay, a first PER, a first maximum burst size, a first periodicity associated with a flow description and so forth.

In some example embodiments, the plurality of alternative service requirements may be in a prioritized order, for example, based on the priority. The alternative service requirements may include one or more requested alternative QoS parameter set.

Each of the plurality of alternative service requirements may include at least one long time-scale rate control requirement and at least one short time-scale rate control requirement associated with the flow description. In particular, the at least one long time-scale rate control requirement may comprise a second requested GFBR. The at least one short time-scale rate control requirement may comprise at least one of the following: a second maximum burst size, a second periodicity, or an FPS associated with the flow description.

In some example embodiments, the first device 110 may indicate discrete rate control points to the second device 120 with new parameters of {Maximum Burst Size, Transmit interval}. Alternatively, the transmit interval may be set as frames per second for a video service.

Additionally, in some example embodiments, the first device 110 may also subscribe an event notification about QNC report from 5GS.

In some example embodiments, the service request may be transmitted via one of a Nnef service or a Npcf service. For example, the NEF may forward the received QoS parameters of the AF session to the second device 120 by using the Npcf service, such as, Npcf_PolicyAuthorization-_Update service.

Based on receipt of the service request, the second device 120 determines 310 at least one alternative QoS parameter set based on the group of service parameters and the plurality of alternative service requirements associated with a service data flow corresponding to the flow description. For example, the at least one alternative QoS parameter set may be in a prioritized order (e.g., the same order) indicated by the first device 110.

Each alternative QoS parameter set may comprise a first subset of long time-scale rate control parameters and a second subset of short time-scale rate control parameters. By way of example, in case that the NEF receives both individual QoS parameter GFBR and alternative service requirements with {transmit interval, Maximum Burst Size}, the second device 120 may derive both the long time-scale and the short time-scale rate control requirements for requested DC-GBR service data flows.

In some example embodiments, the first subset of long time-scale rate control parameters may comprise a pair of an alternative GFBR and a corresponding AW associated with the service data flow, for example, a pair of {GFBR, AW}. In particular, the second device 120 may perform 5QI mapping and derive the PDB and AW.

In some example embodiments, the short subset of short time-scale rate control parameters may comprise at least one of a maximum data burst volume, MDBV, a periodicity, or an FPS associated with the service data flow, for example, a pair of {MDBV, periodicity}. In particular, the periodicity may be derived by the received FPS. With both PDB and the CN PDB obtained from the third device 130, the second device may determine a packet delay budget of a radio access network (5G-AN PDB) associated with the PDU session. In addition, the second device 120 may derive the MDBV based on the maximum burst size and the 5G-AN PDB as below:

$$MDBV = \text{max burst size} * \text{ceil}(5G\text{-}AN\ PDB/\text{periodicity}) \tag{7}$$

The second device 120 then transmits 315 the group of requested service parameters and the at least one alternative QoS parameter set to the third device 130 for determining a requested QoS profile and at least one alternative QoS profile.

In particular, the second device 120 may convey the rate control points, e.g., long and short time-scale rate control requirements to the third device 130. For example, the second device 120 may add new parameters {MDBV, periodicity} to a list of alternative QoS parameters sets and provide them to the third device 130 within PCC rules in the order (e.g., same prioritized order) indicated by the first device 110. As mentioned herein, the long time-scale rate control requirements may be indicated by pairs of {GFBR, AW} and the short time-scale rate control requirements may be indicated by pairs of {MDBV, periodicity} and derived 5G-AN PDB in RAN.

Based on receipt of the event notification subscription about QNC, the second device 120 may also enable QNC and include the indicator in the PCC rule sent to the third device 130.

Accordingly, the third device 130 determines 320 a requested QoS profile based on the group of requested service parameters.

In addition, the third device 130 determines 325 at least one alternative QoS profile based on the at least one alternative QoS parameter set associated with a QoS flow corresponding to the service data flow. In particular, the third device 130 may add parameters {MDBV, periodicity} to a list of alternative QoS parameters sets in the order (e.g., same prioritized order) received from the second device 120. Each alternative QoS profile may include the first subset of long time-scale rate control parameters and the second subset of short time-scale rate control parameters.

The third device 130 then transmits 330 the requested QoS profile and the at least one alternative QoS profile to the fourth device 140. In particular, the third device 130 may convey alternative QoS parameter sets together with the received QNC to the fourth device 140 via SM NAS signaling e.g., PDU Session Resource Modify Request.

In this manner, RAN is aware of discrete rate control points to be able to configure and reserve the corresponding resources for the QoS flow, such as, DC-GBR (e.g., minimum rate for acceptable QoS, QoE, etc).

Based on receipt of the requested QoS profile and at least one alternative QoS profile, the fourth device 140 perform 335 radio admission control on the QoS flow based on a network condition, the requested QoS profile and the at least one alternative QoS profile.

In some example embodiments, based on receipt of the alternative QoS profiles with different short time-scale rate control parameters {MDBV, periodicity}, the fourth device 140 may establish multiple configurated grant (CG) or semi-persistent scheduling (SPS) configurations in advance.

In some example embodiments, the fourth device 140 may determine whether the requested QoS profile is fulfilled based on the network condition. If the requested QoS profile cannot be fulfilled, the fourth device 140 may further determine if any of the alternative QoS profiles can be fulfilled based on the network condition.

For instance, based on the short-term to long-term rate ratio (peak-to-average throughput ratio in FIG. 2, derived from MDBV, PDB and GFBR), the RAC function in RAN may estimate that fulfilling the demands of a certain QoS profile requires an excessive or not feasible reservation of resources, whereas the resource requirement for an alternative QoS profile (e.g., with lower peak-to-average throughput ratio) might be acceptable.

If there is a match, that is, at least one alternative QoS profile can be fulfilled, the fourth device 140 may transmit 340 a reference (e.g., an index) of a first alternative QoS profile that can be fulfilled and with the highest priority among the at least one alternative QoS profile together with a notification of the requested QoS profile that is no longer fulfilled (e.g., via a notification cause) to the third device 130. The reference and the notification may, for example, be transmitted via SM NAS signaling e.g., PDU Session Resource Modify Response. In addition, the fourth device 140 may perform RAC based on the second subset of short time-scale rate control parameters.

In some example embodiments, in addition to the notification and the reference of the first alternative QoS profile, at 340, the fourth device 140 may further transmit a notification of at least a part of the first subset of long time-scale rate control parameters and a second subset of short time-scale rate control parameters corresponding to a second alternative QoS profile that cannot be fulfilled. In particular, the first alternative QoS profile is associated with a first priority, and the second alternative QoS profile is associated with a second priority, where the second priority is higher than and followed by the first priority in the prioritized order. In this manner, the RAN can transmit a notification of at least a part of the first subset of long time-scale rate control parameters and the second subset of short time-scale rate control parameters that cannot be fulfilled, resulting in an alternative QoS profile with a relatively high priority being no longer fulfilled. In other words, the RAN is able to indicate whether the long time-scale rate control parameters or the short time-scale rate control parameters, and/or which one or more of {GFBR, AW} and {MDBV, periodicity} cannot be guaranteed at RAN. Such a notification may then be provided to the first device 110 via the third device 130 and the second device 120.

In this case, the third device 130 may transmit 345 the notification and the reference of the first alternative QoS profile and selectively the notification of at least a part of the first subset of long time-scale rate control parameters and a second subset of short time-scale rate control parameters corresponding to the second alternative QoS profile to the second device 120.

Based on receipt of at least the notification and the reference, the second device 120 may transmit 350 a report of QoS notification to the first device 110 for performing rate adaptation. In particular, the report may comprise a notification of the group of requested service parameters being no longer fulfilled and a reference of a first alternative QoS parameter set corresponding to the first alternative QoS profile. The group of requested service parameters corresponds to the requested QoS profile.

Otherwise, there is no match, in other words, if none of the at least one alternative QoS profile can be fulfilled, that is, the alternative QoS profile with the lowest priority in the prioritized order cannot be fulfilled, the fourth device 140 may transmit the QNC with the notification of the requested QoS profile that is no longer fulfilled (e.g., a notification cause as "not fulfilled" transmitted in a SM NAS signaling) to the third device 130. Additionally, or alternatively, the fourth device 140 may separately transmit a notification of at least a part of the first subset of long time-scale rate control parameters and the second subset of short time-scale rate control parameters cannot be fulfilled, i.e., whether the long time-scale rate control parameters or the short time-scale rate control parameters, and/or which one or more of {GFBR, AW} and {MDBV, periodicity} cannot be guaranteed. Such a notification may then be provided to the first device 110 via the third device 130 and the second device 120.

Additionally, or alternatively, in some example embodiments, the first device 110 may cause at least a part of the group of requested service parameters and the plurality of alternative service requirements to be adjusted based on the report.

During a lifetime of the QoS flow, the fourth device 140 may perform 355 QoS fulfilment, for example, a more accurate estimation of feasible QoS to fulfil based on received rate control points (e.g., the long and short time-scale rate control parameters). The fourth device 140 may attempt (e.g., always attempt) to fulfil the QoS profile.

If the requested QoS profile cannot be fulfilled, the fourth device 140 may determine if any of the alternative QoS profiles is fulfilled in the prioritized order. If there is a match (i.e., at least one alternative QoS profile can be fulfilled), similar to step 340, the fourth device 140 may transmit 360 a reference (e.g., an index) of a third alternative QoS profile that can be fulfilled and with the highest priority among the at least one alternative QoS profile together with a notification of the requested QoS profile that is no longer fulfilled to the third device 130.

In some example embodiments, in addition to the notification and the reference of the first alternative QoS profile, at 360, the fourth device 140 may further transmit a notification of at least a part of the first subset of long time-scale rate control parameters and a second subset of short time-scale rate control parameters corresponding to a fourth alternative QoS profile that cannot be fulfilled. In particular, the third alternative QoS profile is associated with a third priority, and the fourth alternative QoS profile is associated with a fourth priority, where the fourth priority is higher than and followed by the third priority in the prioritized order.

Similar to step 345, the third device 130 may transmit 365 the notification and the reference of the third alternative QoS profile and selectively the notification of at least a part of the first subset of long time-scale rate control parameters and a second subset of short time-scale rate control parameters corresponding to the fourth alternative QoS profile to the second device 120.

Based on receipt of at least the notification and the reference, the second device 120 may transmit 370 a report of QoS notification to the first device 110 for performing rate adaptation. In particular, the report may comprise a notification of the group of requested service parameters being not fulfilled and a reference of a third alternative QoS parameter set corresponding to the third alternative QoS profile. The group of requested service parameters corresponds to the requested QoS profile. It shall be noted that it could also be possible to make up-grade or down-grade to another or a previous QoS profile after a while.

Additionally, in some example embodiments, additional information may be gathered during the service lifetime, for example, the cell load, resource consumption, packet delay statistics, achieved rates, etc. The fourth device 140 may estimate a feasible alternative QoS profile in a more accurate manner in case of availability of several MDBV or GFBR combinations to choose from. In particular, choosing an alternative QoS profile with a larger MDBV means that the packet scheduler commits to treat a larger volume of burst data with delay-critical priority and PDB guarantees. In one embodiment, if any of the alternative QoS profile is selected by the fourth device 140, the fourth device 140 may activate or deactivate some of the established CG or SPF configurations to match the new selected {MDBV, periodicity}.

Otherwise, for QoS fulfilment, if none of the at least one alternative QoS profile can be fulfilled, that is, the alternative QoS profile with the lowest priority in the prioritized order cannot be fulfilled, the fourth device 140 may transmit the QNC with the notification of the requested QoS profile that is no longer fulfilled (e.g., a notification cause as "not fulfilled" transmitted in a SM NAS signaling) to the third device 130. Additionally, or alternatively, the fourth device 140 may transmit a notification of at least a part of the first subset of long time-scale rate control parameters and the second subset of short time-scale rate control parameters cannot be fulfilled, i.e., whether the long time-scale rate control parameters or the short time-scale rate control parameters, and/or which one or more of {GFBR, AW} and {MDBV, periodicity} cannot be guaranteed. Such a notification may then be provided to the first device 110 via the third device 130 and the second device 120.

Based on receiving the QNC from RAN, the 5GC may indicate the current QoS fulfilment situation to the AF. For example, in the above case, the third device 130 may transmit 365 at least the notification and/or the reference to the second device 120. The second device 120 may then forward 370 the notification and/or the reference to the first device 110.

In this manner, the rate control and adaptation between application and 5GS can be synchronized. The AF is then expected to adapt the rate according to the burst size, FPS provided earlier for the corresponding alternative QoS parameter set.

It should be understood that the process 300 is applicable to both DL traffic and UL traffic. For DL traffic, the AF may further inform the AS to trigger adaptation of DL traffic. For UL traffic, the AF may notify the application layer client in the UE using application layer protocol, which triggers adaptation of UL traffic.

According to the example embodiments, there is provided a solution of aligned rate control configuration and adaptation between applications and 5GS. With the solution, additional traffic characteristics including maximum burst size and transmit interval for each alternative service requirement can be provided from AF to 5GC. The 5GC is able to convey both long and short time-scale rate control requirements to the RAN. As a result, more accurate RAC decisions and estimation of feasible alternative QoS can be performed at RAN based on the requested or alternative long time-scale and short time-scale rate control requirements provided by the 5GC. The evaluation of short time-scale rate control requirements can also affect the QoS notification sent from RAN to 5GC. Moreover, the AF can also benefit from the notification from 5GS on RAN and determines feasible discrete rate-control points, e.g., matching the traffic properties via the rate adaptation algorithm to the alternative QoS profile notified by the RAN.

Example Methods

Figure 4:
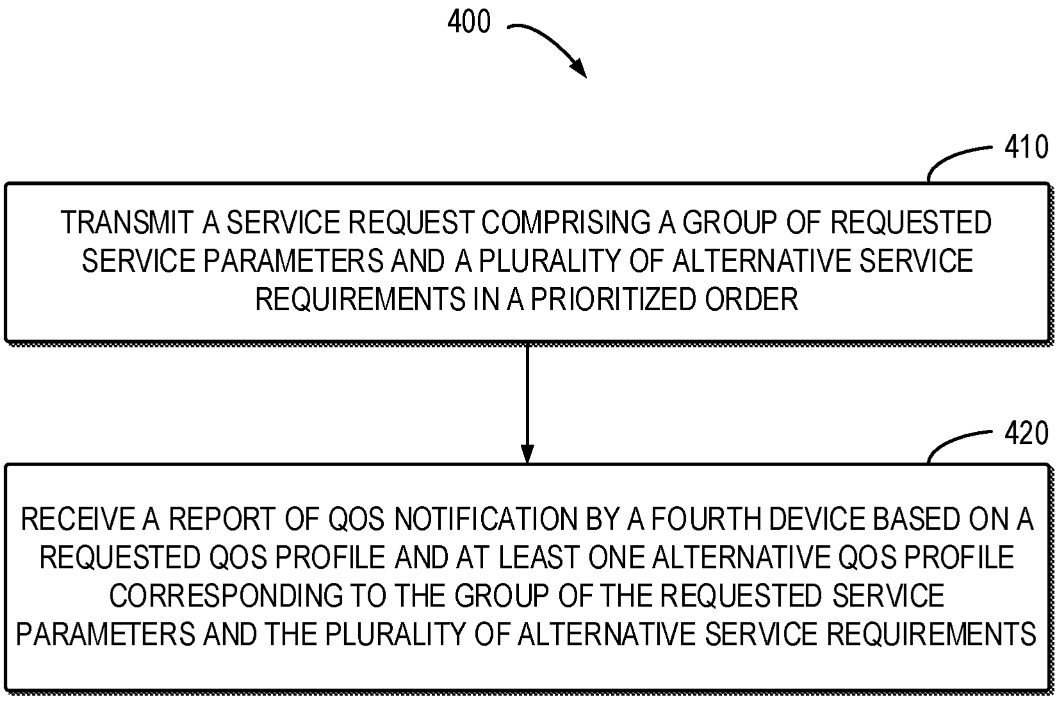
FIG. 4 illustrates a flowchart of a method implemented at a first device according to some example embodiments of the disclosure.

FIG. 4 illustrates a flowchart of a method 400 implemented at a first device according to some example embodiments of the disclosure. For example, the first device may include a first network device for implementing AF. For the purpose of discussion, the method 400 will be described from the perspective of the first device 110 in FIG. 1.

At block 410, the first device 110 transmits, to a second device 120, a service request comprising a group of requested service parameters and a plurality of alternative service requirements in a prioritized order. Each alternative service requirement comprises at least one long time-scale rate control requirement and at least one short time-scale rate control requirement associated with a flow description.

In some example embodiments, the group of requested service parameters may comprise at least one of the following individual QoS parameters: a first requested GFBR, a first requested 5GS Delay, a first requested PER, a first maximum burst size, or a first periodicity associated with the flow description. The at least one long time-scale rate control requirement may comprise a second requested GFBR. The at least one short time-scale rate control requirement may comprise at least one of the following: a second maximum burst size, a second periodicity, or an FPS associated with the flow description.

In some example embodiments, the service request may be transmitted via one of a Nnef service or a Npcf service.

At block 420, the first device 110 receives, from the second device 120, a report of QoS notification by a fourth device 140 based on a requested QoS profile and at least one alternative QoS profile corresponding to the group of the requested service parameters and the plurality of alternative service requirements.

In some example embodiments, the report may comprise at least one of a notification of the group of requested service parameters being no longer fulfilled and a reference of a first alternative QoS parameter set associated with a first priority in the prioritized order and corresponding to one of the plurality of alternative service requirements that can be fulfilled at a radio access network. The first device 110 may further determine, based on the reference, at least one short time-scale rate control requirement corresponding to the requested alternative QoS parameter set. The first device 110 may then perform rate adaptation based on the at least one short time-scale rate control requirement.

In some example embodiments, the report may further comprise at least one of the long time-scale rate control requirement and the short time-scale rate control requirement corresponding to a second alternative QoS parameter set that cannot be fulfilled at a radio access network, the second alternative QoS parameter set is associated with a second priority followed by the first priority in the prioritized order and corresponds to another one of the plurality of alternative service requirements, the second priority is higher than the first priority.

In some example embodiments, the first device 110 may further cause at least a part of the group of requested service parameters and the plurality of alternative service requirements to be adjusted based on the report.

In some example embodiments, the first device 110 may comprise a first network device for implementing AF, the second device 120 may comprise a second network device for implementing PCF or NEF, and the fourth device 140 may comprise a fourth network device at the RAN.

Figure 5:
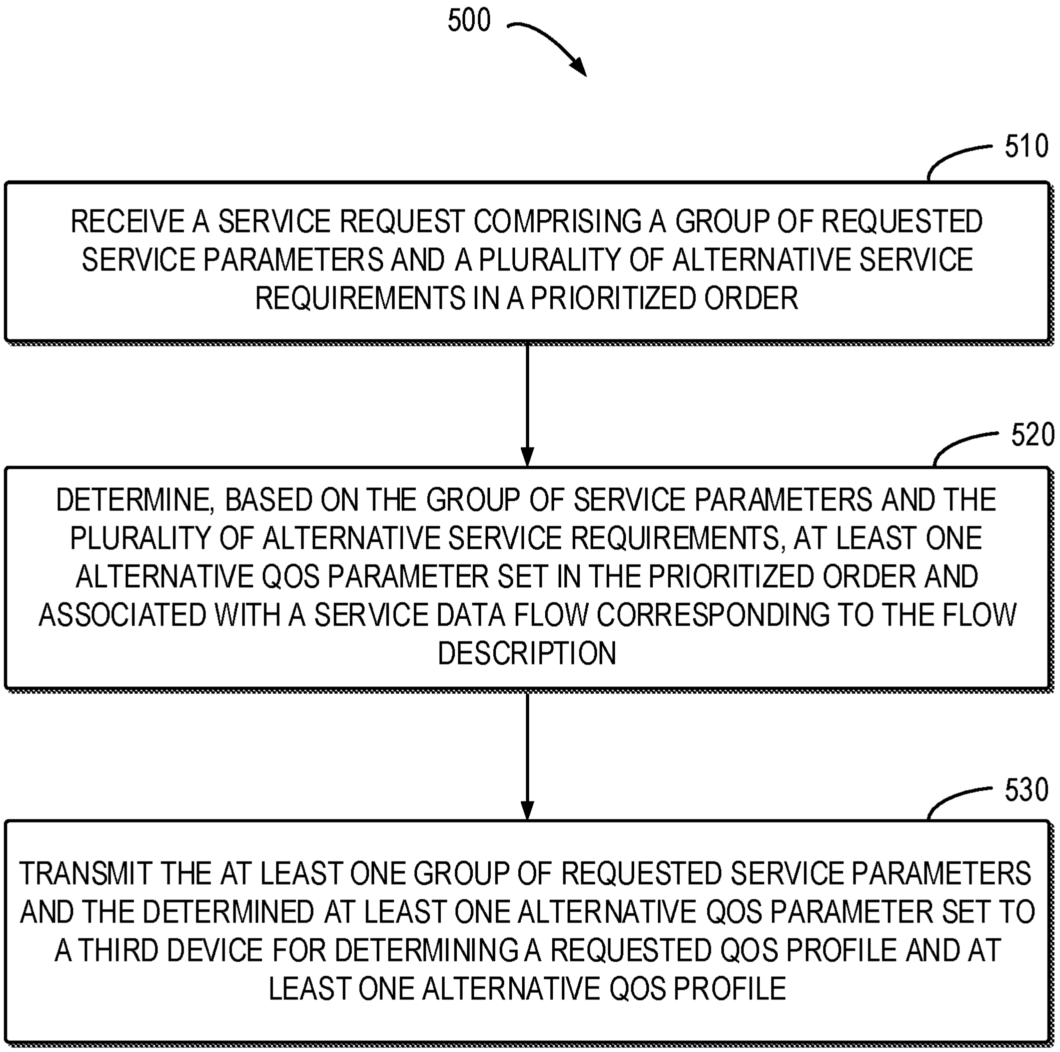
FIG. 5 illustrates a flowchart of a method implemented at a second device according to some example embodiments of the disclosure.

FIG. 5 illustrates a flowchart of an example method 500 implemented at a second device in accordance with some example embodiments of the disclosure. For example, the second device may include a second network device for implementing PCF. For the purpose of discussion, the method 500 will be described from the perspective of the second device 120 in FIG. 1.

At 510, the second device 120 receives, from a first device 110, a service request comprising a group of requested service parameters and a plurality of alternative service requirements in a prioritized order. The plurality of alternative service requirements comprises at least one long time-scale rate control requirement and at least one short time-scale rate control requirement associated with a flow description.

In some example embodiments, the group of requested service parameters may comprise at least one of the following individual QoS parameters: a first requested GFBR, a first requested 5GS delay, a first requested PER, a first maximum burst size, or a first periodicity associated with the flow description. The at least one long time-scale rate control requirement comprises a second requested GFBR. The at least one short time-scale rate control requirement comprises at least one of the following: a second maximum burst size, a second periodicity, or an FPS associated with the flow description.

In some example embodiments, the first subset of long time-scale rate control parameters may comprise a pair of an alternative GFBR and a corresponding AW associated with the service data flow. The short subset of short time-scale rate control parameters may comprise at least one of a MDBV, a periodicity, or an FPS associated with the resource type, and the MDBV is determined based on the at least one set of short time-scale rate control parameters and a packet delay budget of RAN.

In some example embodiments, the at least one determined group of requested service parameters and the determined at least one alternative QoS parameter set may be transmitted via a PCC rule.

At 520, the second device 120 determines, based on the group of service parameters and the plurality of alternative service requirements, at least one alternative QoS parameter set in the prioritized order and associated with a service data flow corresponding to the flow description, each alternative QoS parameter set comprising a first subset of long time-scale rate control parameters and a second subset of short time-scale rate control parameters.

At 530, the second device 120 transmits the at least one group of requested service parameters and the determined at least one alternative QoS parameter set to a third device 130 for determining a requested QoS profile and at least one alternative QoS profile.

Additionally, or alternatively, in some example embodiments, the second device 120 may receive, from the third device 130, at least one of a notification of the requested QoS profile being no longer fulfilled and a reference of the alternative QoS profile corresponding to a first alternative QoS parameter set associated with a first priority in the prioritized order. The second device 120 may then transmit a report comprising at least one of a notification of the group of requested service parameters being no longer fulfilled and a reference of a first alternative QoS parameter set corresponding to one of the at least one alternative QoS profile to the first device for performing rate adaptation. The group of requested service parameters corresponds to the requested QoS profile.

Additionally, or alternatively, in some example embodiments, the second device 120 may receive, from the third device 130, a notification of at least a part of the first subset of long time-scale rate control parameters and a second subset of short time-scale rate control parameters corresponding to another one of the at least one alternative QoS profile being no longer fulfilled. In this case, the report may further comprise at least one of the long time-scale rate control requirement and the short time-scale rate control requirement corresponding to the at least a part of the first subset of long time-scale rate control parameters and a second subset of short time-scale rate control parameters for a second alternative QoS parameter set. The second alternative QoS parameter set may be associated with a second priority followed by the first priority in the prioritized order and correspond to another one of the plurality of alternative service requirements, where the second priority is higher than the first priority.

In some example embodiments, the first device 110 may comprise a first network device for implementing AF, the second device 120 may comprises a second network device for implementing PCF or NEF, and the third device 130 may comprise a third network device for implementing SMF.

Figure 6:
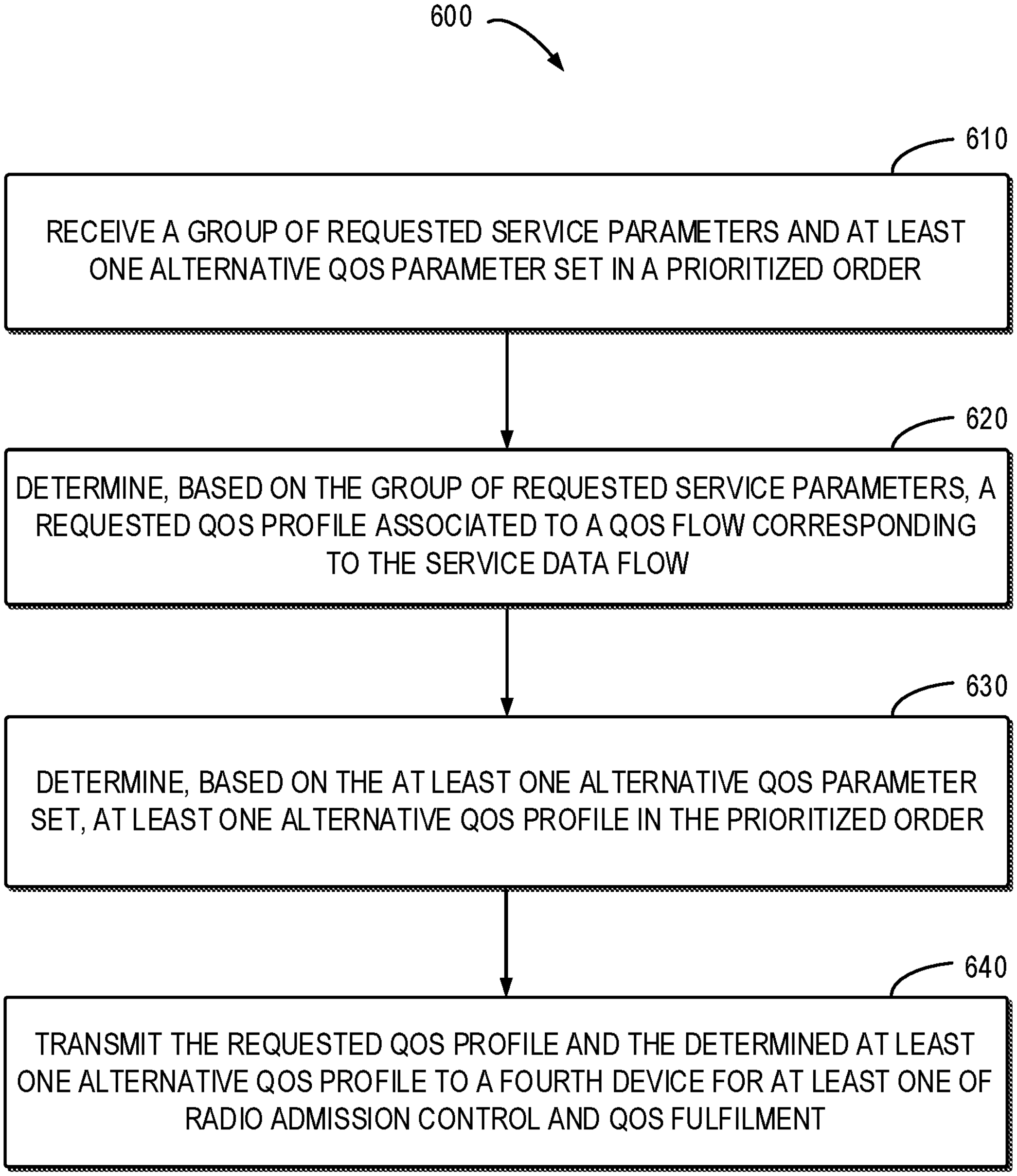
FIG. 6 illustrates a flowchart of a method implemented at a third device according to some example embodiments of the disclosure.

FIG. 6 illustrates a flowchart of an example method 700 implemented at a third device in accordance with some example embodiments of the disclosure. For example, the third device may include an LMF. For the purpose of discussion, the method 700 will be described from the perspective of the third device 130 in FIG. 1.

At block 610, the third device 130 receives, from a second device 120, a group of requested service parameters and at least one alternative QoS parameter set in a prioritized order. Each alternative QoS parameter set comprises a first subset of long time-scale rate control parameters and a second subset of short time-scale rate control parameters associated with a flow description corresponding to a service data flow.

In some example embodiments, the first subset of long time-scale rate control requirements may comprise a pair of an alternative GFBR and a corresponding AW associated with the service data flow. The short subset of short time-scale rate control requirements may comprise at least one of a MDBV a periodicity, or an FPS associated with the service data flow.

In some example embodiments, the group of requested service parameters and the determined at least one alternative QoS parameter set may be received via a PCC rule.

At block 620, the third device 130 determines, based on the group of requested service parameters, a requested QoS profile associated to a QoS flow corresponding to the service data flow.

At block 630, the third device 130 determines, based on the at least one alternative QoS parameter set, at least one alternative QoS profile in a prioritized order. Each alternative QoS profile comprises the first subset of long time-scale rate control parameters and the second subset of short time-scale rate control parameters.

At block 640, the third device 130 transmits the requested QoS profile and the at least one alternative QoS profile to a fourth device 140 for at least one of radio admission control and QoS fulfilment.

Additionally, or alternatively, in some example embodiments, the third device 130 may receive, from the fourth device 140, a notification of the requested QoS profile being no longer fulfilled and a reference of an alternative QoS profile at a radio access network. The third device 130 may then transmit, to the second device 120, at least one of the notification and the reference of the alternative QoS profile.

Additionally, or alternatively, in some example embodiments, the third device 130 may receive, from the fourth device 140, a notification of at least a part of the first subset of long time-scale rate control parameters and the second subset of short time-scale rate control parameters corresponding to an alternative QoS profile not being fulfilled. The third device 130 may then transmit, to the second device 120, the notification.

In some example embodiments, the second device 120 may comprise a second network device for implementing PCF or NEF, the third device 130 may comprise a third network device for implementing SMF, and a fourth device 140 may comprise a fourth network device at RAN.

Figure 7:
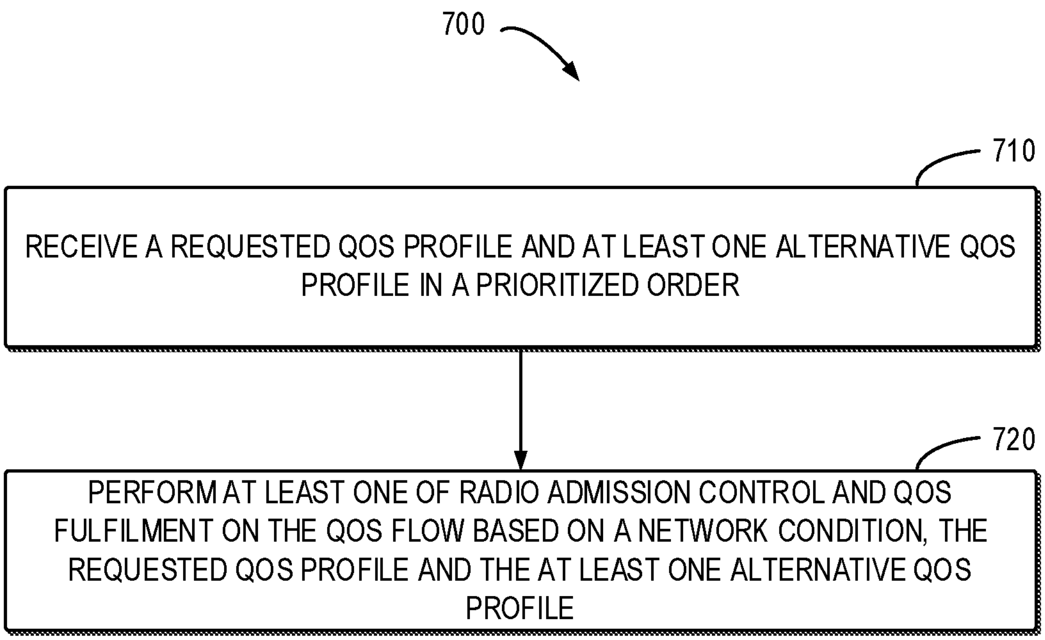
FIG. 7 illustrates a flowchart of a method implemented at a fourth device according to some example embodiments of the disclosure.

FIG. 7 illustrates a flowchart of an example method 700 implemented at a fourth device in accordance with some example embodiments of the disclosure. For example, the fourth device may include a fourth network device at RAN, for example, gNB. For the purpose of discussion, the method 700 will be described from the perspective of the fourth device 140 in FIG. 1

At block 710, the fourth device 140 receives, from a third device 130, a requested QoS profile and at least one alternative QoS profile in a prioritized order. Each alternative QoS profile comprises a first subset of long time-scale rate control parameters and a second subset of short time-scale rate control parameters associated with a QoS flow.

At block 720, the fourth device 140 performs at least one of radio admission control and QoS fulfilment on the service data flow based on a network condition, the requested QoS profile and the at least one alternative QoS profile.

In some example embodiment, during a lifetime of the QoS flow, the fourth device 140 may perform a QoS fulfilment based on the network condition, the requested QoS profile and the at least one alternative QoS profile. This may be a periodical behavior of the fourth device 140 after RAN has received the requested QoS profile and the alternative QoS profile.

In some example embodiments, performing at least one of the radio admission control and the QoS fulfilment may comprise: determining if the requested QoS profile is fulfilled based on the network condition; based on determining that the requested QoS profile is not fulfilled, determining, based on the network condition, if an alternative QoS profile is fulfilled in the prioritized order; based on determining that an alternative QoS profile is fulfilled, transmitting, to the third device, a notification of the requested QoS profile being no longer fulfilled and a reference of the alternative QoS profile being fulfilled at a radio access network.

In some example embodiments, the alternative QoS profile is associated with a first priority in the prioritized order. The fourth device 140 may transmit, to the third device 130, a notification of at least a part of the first subset of long time-scale rate control parameters and a second subset of short time-scale rate control parameters corresponding to another one alternative QoS profile of the at least one alternative QoS profile being no longer fulfilled, the another one alternative QoS profile is associated with a second priority followed by the first priority in the prioritized order.

In some example embodiments, the fourth device 140 may be caused to perform at least one of the radio admission control and the QoS fulfilment by: based on determining that none of the at least one alternative QoS profile is fulfilled, transmitting, to the third device 130, a notification of the requested QoS profile being no longer fulfilled, at least a part of the first subset of long time-scale rate control parameters and a second subset of short time-scale rate control parameters corresponding to one of the at least one alternative QoS profile associated with the lowest priority in the prioritized order.

Additionally, or alternatively, in some example embodiments, the fourth device 140 may select one of a plurality of alternative QoS profile to be fulfilled. The fourth device 140 may then activate or deactivate at least a part of established configurated grant or semi-persistent scheduling configurations for matching the second subset of short time-scale rate control parameters corresponding to the selected alternative QoS profile.

In some example embodiments, the third device 130 may comprises a third network device for implementing SMF, and the fourth device 140 may comprise a fourth network device at RAN.

Example Apparatus, Device and Medium

In some example embodiments, a first apparatus capable of performing any of the method 400 (for example, the first device 110 in FIG. 1) may comprise means for performing the respective operations of the method 400. The means may be implemented in any suitable form. For example, the means may be implemented in a circuitry or software module. The first apparatus may be implemented as or included in the first device 110 in FIG. 1.

In some example embodiments, the first apparatus comprises: means for transmitting, to a second apparatus, a service request comprising a group of requested service parameters and a plurality of alternative service requirements in a prioritized order, the plurality of alternative service requirements comprising at least one long time-scale rate control requirement and at least one short time-scale rate control requirement associated with a flow description; and means for receiving, from the second apparatus, a report of QoS notification by a fourth apparatus based on a requested QoS profile and at least one alternative QoS profile corresponding to the group of the requested service parameters and the plurality of alternative service requirements.

In some example embodiments, the group of requested service parameters comprises at least one of the following individual QoS parameters: a first requested guaranteed flow bit rate, GFBR, a first requested 5G system Delay, a first requested packet error rate, PER, a first maximum burst size, or a first periodicity associated with the flow description, the at least one long time-scale rate control requirement comprises a second requested GFBR, and the at least one short time-scale rate control requirement comprises at least one of the following: a second maximum burst size, a second periodicity, or a frame per second, FPS, associated with the flow description.

In some example embodiments, the service request is transmitted via one of a Nnef service or a Npcf service.

In some example embodiments, the report comprises at least one of a notification of the group of requested service parameters being no longer fulfilled and a reference of a first alternative QoS parameter set associated with a first priority in the prioritized order and corresponding to one of the plurality of alternative service requirements that can be fulfilled at a radio access network, and wherein the first apparatus further comprises: means for determining, based on the reference, at least one short time-scale rate control requirement corresponding to the requested alternative QoS parameter set; and means for performing rate adaptation based on the at least one short time-scale rate control requirement.

In some example embodiments, the report further comprises at least one of the long time-scale rate control requirement and the short time-scale rate control requirement corresponding to a second alternative QoS parameter set that cannot be fulfilled at a radio access network, the second alternative QoS parameter set is associated with a second priority followed by the first priority in the prioritized order and corresponds to another one of the plurality of alternative service requirements, the second priority is higher than the first priority.

In some example embodiments, the first apparatus further comprises: means for causing at least a part of the group of requested service parameters and the plurality of alternative service requirements to be adjusted based on the report.

In some example embodiments, the first apparatus comprises a first network device for implementing AF, and the second apparatus comprises a second network device for implementing PCF or NEF, and the fourth apparatus comprises a fourth network device at a radio access network.

In some example embodiments, a second apparatus capable of performing any of the method 500 (for example, the second device 120 in FIG. 1) may comprise means for performing the respective operations of the method 500. The means may be implemented in any suitable form. For example, the means may be implemented in a circuitry or software module. The second apparatus may be implemented as or included in the second device 120 in FIG. 1.

In some example embodiments, the second apparatus comprises: means for receiving, from a first apparatus, a service request comprising a group of requested service parameters and a plurality of alternative service requirements, the plurality of alternative service requirements in a prioritized order and comprising at least one long time-scale rate control requirement and at least one short time-scale rate control requirement associated with a flow description; means for determining, based on the group of service parameters and the plurality of alternative service requirements, at least one group of service parameters and at least one alternative QoS parameter set in a prioritized order and associated with a service data flow corresponding to the flow description, each alternative QoS parameter set comprising a first subset of long time-scale rate control parameters and a second subset of short time-scale rate control parameters; and means for transmitting the group of requested service parameters and the determined at least one alternative QoS parameter set to a third apparatus for determining a requested QoS profile and at least one alternative QoS profile.

In some example embodiments, the group of requested service parameters comprises at least one of the following individual QoS parameters: a first requested GFBR, a first requested 5GS delay, a first requested PER, a first maximum burst size, or a first periodicity associated with the flow description, the at least one long time-scale rate control requirement comprises a second requested GFBR, and the at least one short time-scale rate control requirement comprises at least one of the following: a second maximum burst size, a second periodicity, or an FPS associated with the flow description.

In some example embodiments, the first subset of long time-scale rate control parameters comprises a pair of an alternative GFBR and a corresponding averaging window (AW) associated with the service data flow, the short subset of short time-scale rate control parameters comprises at least one of a maximum data burst volume (MDBV), a periodicity, or an FPS associated with the service data flow, and the MDBV is determined based on the at least one set of short time-scale rate control parameters and a packet delay budget of a radio access network.

In some example embodiments, the group of requested service parameters and the determined at least one alternative QoS parameter set are transmitted via a policy and charging control (PCC) rule.

In some example embodiments, the second apparatus may further comprise: means for receiving, from the third apparatus, at least one of a notification of the requested QoS profile being no longer fulfilled and a reference of the alternative QoS profile corresponding to a first alternative QoS parameter set associated with a first priority in the prioritized order; and means for transmitting a report comprising at least one of a notification of the group of requested service parameters being no longer fulfilled and a reference of a first alternative QoS parameter set corresponding to one of the at least one alternative QoS profile to the first apparatus for performing rate adaptation, the group of requested service parameters corresponding to the requested QoS profile.

In some example embodiments, the second apparatus may further comprise: means for receiving, from the third apparatus, a notification of at least a part of the first subset of long time-scale rate control parameters and a second subset of short time-scale rate control parameters corresponding to another one of the at least one alternative QoS profile being no longer fulfilled. The report further comprises at least one of the long time-scale rate control requirement and the short time-scale rate control requirement corresponding to the at least a part of the first subset of long time-scale rate control parameters and a second subset of short time-scale rate control parameters for a second alternative QoS parameter set, the second alternative QoS parameter set is associated with a second priority followed by the first priority in the prioritized order and corresponds to another one of the plurality of alternative service requirements, the second priority is higher than the first priority.

In some example embodiments, the first apparatus comprises a first network device for implementing application function, the second apparatus comprises a second network device for implementing policy control function or network exposure function, and the third device comprises a third network apparatus for implementing session management function.

In some example embodiments, a third apparatus capable of performing any of the method 600 (for example, the third device 130 in FIG. 1) may comprise means for performing the respective operations of the method 600. The means may be implemented in any suitable form. For example, the means may be implemented in a circuitry or software module. The second apparatus may be implemented as or included in the third device 130 in FIG. 1.

In some example embodiments, the third apparatus comprises: means for receiving, from a second apparatus, a group of requested service parameters and at least one alternative QoS parameter set in a prioritized order, each alternative QoS parameter set comprising a first subset of long time-scale rate control parameters and a second subset of short time-scale rate control parameters associated with a flow description corresponding to a service data flow; means for determining, based on the group of requested service parameters, a requested QoS profile associated to a QoS flow corresponding to the service data flow; means for determining, based on the at least one alternative QoS parameter set, at least one alternative QoS profile in the prioritized order, each alternative QoS profile comprising the first subset of long time-scale rate control parameters and the second subset of short time-scale rate control parameters; and means for transmitting the requested QoS profile and the determined at least one alternative QoS profile to a fourth apparatus for at least one of radio admission control and QoS fulfilment.

In some example embodiments, the first subset of long time-scale rate control parameters comprises a pair of an alternative GFBR and a corresponding AW associated with the service data flow, and the short subset of short time-scale rate control parameters comprises at least one of a MDBV a periodicity, or an FPS associated with the service data flow.

In some example embodiments, the group of requested service parameters and the determined at least one alternative QoS parameter set are received via PCC rule.

In some example embodiments, the third apparatus may further comprise: means for receiving, from the fourth apparatus, a notification of the requested QoS profile being no longer fulfilled and a reference of an alternative QoS profile at a radio access network; and means for transmitting, to the second apparatus, at least one of the notification and the reference of the alternative QoS profile.

In some example embodiments, the third apparatus may further comprise: means for receiving, from the fourth apparatus, a notification of at least a part of the first subset of long time-scale rate control parameters and the second subset of short time-scale rate control parameters corresponding to an alternative QoS profile not being fulfilled; and means for transmitting the notification to the second apparatus.

In some example embodiments, the second apparatus comprises a second network device for implementing policy control function or network exposure function, the third apparatus comprises a third network device for implementing session management function, and a fourth apparatus comprises a fourth network device at a radio access network.

In some example embodiments, a fourth apparatus capable of performing any of the method 700 (for example, the fourth device 140 in FIG. 1) may comprise means for performing the respective operations of the method 700. The means may be implemented in any suitable form. For example, the means may be implemented in a circuitry or software module. The fourth apparatus may be implemented as or included in the fourth device 140 in FIG. 1.

In some example embodiments, the fourth apparatus comprises: means for receiving, from a third apparatus, a requested QoS profile and at least one alternative QoS profile in a prioritized order, each alternative QoS profile comprising a first subset of long time-scale rate control parameters and a second subset of short time-scale rate control parameters associated with a QoS flow; and means for performing at least one of radio admission control and QoS fulfilment on the QoS flow based on a network condition, the requested QoS profile and the at least one alternative QoS profile.

In some example embodiments, the fourth apparatus further comprises: means for during a lifetime of the QoS flow, performing a QoS fulfilment, based on the network condition, the requested QoS profile and the at least one alternative QoS profile.

In some example embodiments, the means for performing at least one of the radio admission control and the QoS fulfilment may comprise: means for determining if the requested QoS profile is fulfilled based on the network condition; means for based on determining that the requested QoS profile is not fulfilled, determining, based on the network condition, if an alternative QoS profile is fulfilled in the prioritized order; means for based on determining that an alternative QoS profile is fulfilled, transmitting, to the third apparatus, a notification of the requested QoS profile being no longer fulfilled and a reference of the alternative QoS profile being fulfilled at a radio access network.

In some example embodiments, the alternative QoS profile is associated with a first priority in the prioritized order. The fourth apparatus further comprises: means for transmitting, to the third apparatus, a notification of at least a part of the first subset of long time-scale rate control parameters and a second subset of short time-scale rate control parameters corresponding to another one alternative QoS profile of the at least one alternative QoS profile being no longer fulfilled, the another one alternative QoS profile is associated with a second priority followed by the first priority in the prioritized order.

example embodiments, the means for performing at least one of the radio admission control and the QoS fulfilment comprises: means for based on determining that none of the at least one alternative QoS profile is fulfilled, transmitting, to the third apparatus, a notification of the requested QoS profile being no longer fulfilled, at least a part of the first subset of long time-scale rate control parameters and a second subset of short time-scale rate control parameters corresponding to one of the at least one alternative QoS profile associated with the lowest priority in the prioritized order.

In some example embodiments, the fourth apparatus may further comprise: means for selecting one of a plurality of alternative QoS profile to be fulfilled; and means for activating or deactivating at least a part of established configurated grant or semi-persistent scheduling configurations for matching the second subset of short time-scale rate control parameters corresponding to the selected alternative QoS profile.

In some example embodiments, the third apparatus comprises a third network device for implementing session management function, and the fourth apparatus comprises a fourth network device at a radio access network.

Figure 8:
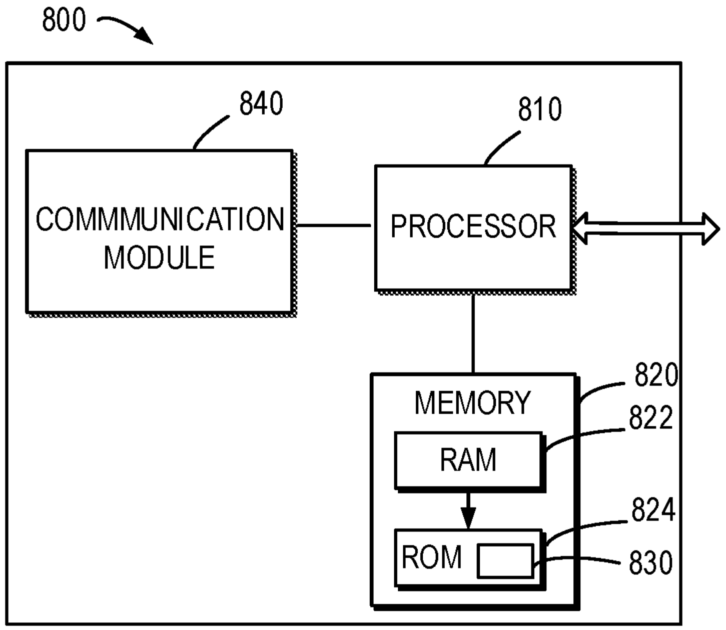
FIG. 8 illustrates a simplified block diagram of a device configured to implement example embodiments of the disclosure.
Figure 9:
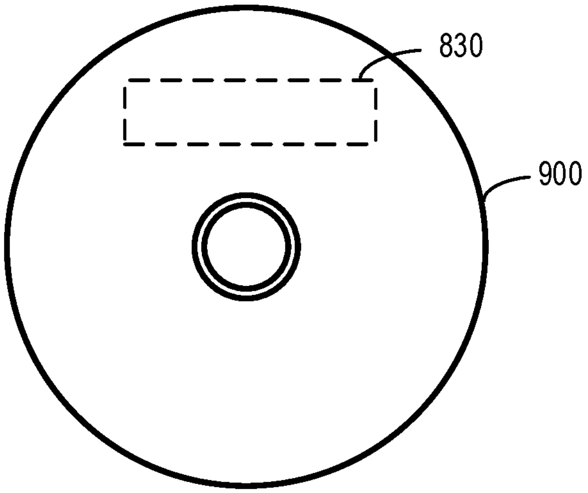
FIG. 9 illustrates a block diagram of an example computer readable medium in accordance with some example embodiments of the disclosure.

FIG. 8 is a simplified block diagram of a device 800 that is configured to implement example embodiments of the disclosure. The device 800 may be provided to implement an electronic device, for example, the first device 110, the second device 120, the third device 130, or the fourth device 140 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface for communication with other network elements. In some example embodiments, the communication module 840 may include at least one antenna.

The processor 810 may be of any type configured to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A program 830 includes executable instructions that are executed by the associated processor 810. The instructions of the program 830 may include instructions for performing operations/acts of some example embodiments of the disclosure. The program 830 may be stored in the memory, e.g., the ROM 824. The processor 810 may perform any suitable actions and processing by loading the program 830 into the RAM 822.

The example embodiments of the disclosure may be implemented by means of the program 830 so that the device 800 may perform any process of the disclosure as discussed with reference to FIG. 3 to FIG. 7. The example embodiments of the disclosure may also be implemented by hardware or by a combination of software and hardware.

In some example embodiments, the program 830 may be tangibly contained in a computer readable medium which may be included in the device 800 (such as, in the memory 820) or other storage devices that are accessible by the device 800. The device 800 may load the program 830 from the computer readable medium to the RAM 822 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (e.g., tangible, not a signal) as opposed to a limitation on data storage persistency (e.g., RAM vs. ROM).

FIG. 8 shows an example of the computer readable medium 800 which may be in form of CD, DVD or other optical storage disk. The computer readable medium 800 has the program 830 stored thereon.

Generally, various embodiments of the disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the disclosure also provide at least one computer program product tangibly stored on a computer readable medium, such as a non-transitory computer readable medium. The computer program product includes executable instructions, such as those included in program modules, being executed in a device on a target physical or virtual processor, to carry out any of the methods as described herein. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the disclosure has been described in language specific to structural features and/or methodological acts, it is to be understood that the disclosure defined in the appended claims is not necessarily limited to the specific features or acts described above. Rather, the specific features and acts described herein are disclosed as example forms of implementing the claims.

What is claimed is:

1. A first device, comprising:

at least one processor; and at least one memory storing instructions that, when executed by the at least one processor, cause the first device at least to:

transmit, to a second device, a service request comprising a group of requested service parameters and a plurality of alternative service requirements in a prioritized order, wherein respective ones of the plurality of alternative service requirements comprise at least one long time-scale rate control requirement and at least one short time-scale rate control requirement associated with a flow description; and receive, from the second device, a report of quality of service (QoS) notification by another device based on a requested QoS profile and at least one alternative QoS profile corresponding to the group of requested service parameters and the plurality of alternative service requirements.

2. The first device of claim 1, wherein the group of requested service parameters comprises one or more of: a first requested guaranteed flow bit rate, GFBR, a first requested 5G system Delay, a first requested packet error rate, PER, a first maximum burst size, or a first periodicity associated with the flow description, the at least one long time-scale rate control requirement comprises a second requested GFBR, and the at least one short time-scale rate control requirement comprises one or more of: a second maximum burst size, a second periodicity, or a frame per second, FPS, associated with the flow description.

3. The first device of claim 1, wherein the service request is transmitted via one of a Nnef service or a Npcf service.

4. The first device of claim 1, wherein the report comprises at least one of a notification of the group of requested service parameters being no longer fulfilled and a reference of a first alternative QoS parameter set associated with a first priority in the prioritized order and corresponding to one of the plurality of alternative service requirements that can be fulfilled at a radio access network, and wherein the first device is further caused to:

determine, based on the reference, at least one short time-scale rate control requirement corresponding to the first alternative QoS parameter set; and perform rate adaptation based on the at least one short time-scale rate control requirement.

5. The first device of claim 4, wherein the report further comprises the at least one long time-scale rate control requirement or the at least one short time-scale rate control requirement corresponding to a second alternative QoS parameter set that cannot be fulfilled at a radio access network, the second alternative QoS parameter set is associated with a second priority followed by the first priority in the prioritized order and corresponds to another one of the plurality of alternative service requirements, the second priority is higher than the first priority.

6. The first device of claim 4, wherein the first device is further caused to:

cause at least a part of the group of requested service parameters and the plurality of alternative service requirements to be adjusted based on the report.

7. The first device of claim 1, wherein the first device comprises a first network device for implementing application function, the second device comprises a second network device for implementing policy control function or network exposure function, and the another device comprises another network device at a radio access network.

8. A device, comprising:

at least one processor; and at least one memory storing instructions that, when executed by the at least one processor, cause the device at least to:

receive, from another device, a requested quality of service (QoS) profile and a plurality of alternative QoS profiles in a prioritized order, wherein respective ones of the plurality of alternative QoS profiles comprise a first subset of long time-scale rate control parameters and a second subset of short time-scale rate control parameters associated with a QoS flow;

perform at least one of radio admission control and QoS fulfilment by determining if the requested QoS profile can be fulfilled based on a network condition;

responsive to determining that the requested QoS profile is not fulfilled, determine, based on the network condition, if an alternative QoS profile of the plurality of alternative QoS profiles is fulfilled in the prioritized order; and responsive to determining that the alternative QoS profile is not fulfilled, transmit, to the another device, a notification of the requested QoS profile being no longer fulfilled, at least a part of the first subset of long time-scale rate control parameters and a second subset of short time-scale rate control parameters corresponding to the alternative QoS profile associated with a lowest priority in the prioritized order.

9. The device of claim 8, wherein the device is further caused to:

during a lifetime of the QoS flow, perform a QoS fulfilment, based on the network condition, the requested QoS profile and the alternative QoS profile.

10. The device of claim 8, wherein the device is caused to perform at least one of the radio admission control and the QoS fulfilment by:

based on determining that the alternative QoS profile is fulfilled, transmitting, to the another device, a notification of the requested QoS profile being no longer fulfilled and a reference of the alternative QoS profile being fulfilled at a radio access network.

11. The device of claim 10, wherein the alternative QoS profile is associated with a first priority in the prioritized order, and the device is further caused to:

transmit, to the another device, a notification of at least a part of the first subset of long time-scale rate control parameters and a second subset of short time-scale rate control parameters corresponding to a second alternative QoS profile of the plurality of alternative QoS profiles being no longer fulfilled, the second alternative QoS profile is associated with a second priority followed by the first priority in the prioritized order.

12. The device of claim 10, wherein the device is further caused to:

select one of the plurality of alternative QoS profiles to be fulfilled; and activate or deactivate at least a part of an established configured grant or semi-persistent scheduling configurations for matching the second subset of short time-scale rate control parameters corresponding to the selected alternative QoS profile.

13. The device of claim 10, wherein the device comprises a network device for implementing session management function, and the another device comprises another network device at a radio access network.

14. A method comprising:

receiving, at one device and from another device, a requested quality of service (QoS) profile and a plurality of alternative QoS profiles in a prioritized order, wherein respective ones of the plurality of alternative QoS profiles comprise a first subset of long time-scale rate control parameters and a second subset of short time-scale rate control parameters associated with a QoS flow;

performing at least one of radio admission control and QoS fulfilment by determining if the requested QoS profile can be fulfilled based on a network condition;

responsive to determining that the requested QoS profile is not fulfilled, determining, based on the network condition, if an alternative QoS profile of the plurality of alternative QoS profiles is fulfilled in the prioritized order; and responsive to determining that the alternative QoS profile is not fulfilled, transmitting, to the another device, a notification of the requested QoS profile being no longer fulfilled, at least a part of the first subset of long time-scale rate control parameters and a second subset of short time-scale rate control parameters corresponding to the alternative QoS profile associated with a lowest priority in the prioritized order.

* * * * *